United States Patent Office 3,131,070
Patented Apr. 28, 1964

3,131,070
PROCESS FOR PACKAGING CONCENTRATED TOMATOES
Vasco Martins, Brussels, Belgium, assignor to Nogueira & Cie, societe congolaise de personnes a responsabilite limitee, Bruxelles, (Belgium), a company
No Drawing. Filed Sept. 27, 1961, Ser. No. 141,028
Claims priority, application Luxembourg Sept. 29, 1960
1 Claim. (Cl. 99—186)

This invention relates to a process and package for the packaging of concentrated tomatoes and the like for preservation.

Such packages are, generally, constituted by hermetically closed tin boxes, subjected in an oven to different temperatures from 35° to 70°, it has been found that the concentrated tomatoes have clearly turned brown or sienna.

Most metal boxes on the market have not therefore been considered perfect or simply suitable.

Also, the metal packages do not enable the contents to be seen. Further, they are of a fairly high cost.

The present invention has for an object to determine the minimal and indispensable conditions of producing packages which maintain the quantities of the concentrated tomatoes and, notably conserve to the latter their natural red colour, their smell and taste.

It also has for its object to provide transparent packages satisfying these quantities, of a minimum cost price and able to withstand the conditions of transport and storage in tropical countries.

To determine with exactitude the necessary and sufficient conditions of the operations according to the characteristic of the invention, a certain number of experiences have to be realized.

Numbers of plastics and complexes in the form of sealed sachets containing concentrated tomatoes have been exposed to sun light, to ultra-violet rays also to temperatures of 38° C. to 70° C.

After a certain time lapse, varying with the nature of the material, the contents of all the sachets of a natural red-brown perceptibly attain, after a period of 15 days, a colour generally sienna.

It was therefore not apparently possible to realize a package under plastic convenient for concentrated tomatoes in the imposed conditions.

Research has been made for the causes of this alteration in colour.

It is first apparent that the action of the sunlight can be discarded for the sachets exposed to the obscured heat browned very much qiucker than under the ultra violet rays or exposed to the sun's rays.

In order to verify if this phenomenon of browning was connected exclusively to the employment of plastic, a series of experiments were made by packing the concentrated tomatoes in an hermetically closed glass flask. These flasks have been exposed to the sunlight, put in a warm stove, at 38° C., at 50° C., at 60° C., at 70° C.

After some hours at 70° C. and 2 days at 38° C., the contents of the flasks had unquestionably browned. Nevertheless, the phenomenon occurred slower than in the plastic sachets. It can therefore be concluded that the first cause of the browning was independent of the packaging in plastic, but that this, according to its nature or composition, can also accelerate the browning reaction.

The diverse plastic materials used present different permeabilities to water vapour, oxygen, nitrogen and carbon dioxides. The hypothesis to be expressed is that certain gases occluded in the concentration at first be the real causes of browning.

In order to verify this hypothesis, of the concentrated tomatoes placed in a glass flask and fully freed from gas under a vacuum of 730 to 740 mm. of mercury, these flasks, maintained under vacuum, have been exposed all around to sunlight and to the stove at 38° C.–50–60–70° C. At the same time, the concentrated tomatoes were exposed to 70° C. in its original package, that is to say in the metal box.

After 24 hours of exposure in these conditions, the concentrated tomatoes in the glass flasks had retained their original colour, but, on the contrary, the concentration in the box had clearly browned.

When the glass flasks were exposed to sunlight and to temperatures of 38° C.–50° C., they did not show browning after 4 weeks of trials.

On the other hand, in a series of flasks containing concentrated tomatoes previously freed from gases, has been reintroduced either air, oxygen or nitrogen. After some hours of exposure at 50° C. the browning appeared and the concentration of the flask with share of oxygen took on a pronounced sienna tint.

In conclusion, it is therefore indispensable, if it is wished to stabilize the tint of the concentrated tomatoes, to eliminate on the one hand the air or the occluded gases in the paste and on the other hand, to prevent them conseqently repenetrating.

After which, research was made for a transparent and plastic material having the strongest impermeability to the gases.

The materials obtainable did not have all the required qualities. It is necessary to have a barrier material having an impermeability to gas and also to water vapour to guard against all loss of weight.

Finally, the concentrated tomatoes with gas removed has been introduced in the sachets made of complex form in plastic material having a total impermeability to the gases and to the vapour and able to withstand a heating of at least 90°. These sachets have been sealed and subsequently subjected to trials of aging to the obscure and light heat. The results have been convincing and browning has not been noted. Nevertheless, certain sachets have swelled up after some days. The removal of the gas contained inside has revealed the presence of $CO_2$. There is thus an anaerobe fermentation, the aerobe microbes have been destroyed from the temperature of 35° C. To suppress this fault, other sachets conditioned as described above have been subjected in the oven to 90° C. for 2 hours. After several weeks of exposure, a fermentation was not noted.

From these different trials and observations, it is deduced that to provide a perfect packaging for concentrated tomatoes, it is sufficient:

(1) To remove the gas from the product;
(2) To place free from gas and air in a material impermeable to gas and to water vapour;
(3) To sterilize by heating the package and its contents to a temperature sufficient to destroy the bacteria.

Packages containing concentrated tomatoes thus treated conserve in a practically indefinite manner.

For a better understanding of the invention a practical embodiment will now be described.

Some concentrated tomatoes is previously freed from gas under a vacuum of 730 to 740 mm. of mercury.

Manipulated under this vacuum, it is introduced into its package which can be of practically impermeable metal, or eventually into flasks of equally impermeable glass, but which has the advantage of being transparent, whereby the concentrated tomatoes can be seen with its natural red colour.

Nevertheless, these packages of metal or of glass are expensive and are rather heavy for transportation, necessitating the payment of transportation costs.

It is more advantageous to choose a material of plastic material of little weight, transparent and satisfying the conditions of impermeability to gases and vapour and resistance to heat.

One such package is, for example, among others satisfying these conditions, embodied in the form of sachets of which the walls comprise between two layers of plastic material called "cellophane" a layer of varnish and a layer of microcrystalline wax. These layers are welded in the form of sachets hermetically sealed by known means, after having been filled under vacuum, with concentrated tomatoes.

After which, they are subjected to heating to about 90° C. for example, to destroy the microbes.

Packages of this latter type not only permit the red colour of the concentrated tomatoes, conserved indefinitely as in tropical countries, to be seen, but also retain to the tomato its smell and good taste.

They have an agreeable presentation and are easy to handle. Their light weight permits smaller freight. They can be transported in cases or cartons of wood. They are simple to open and avoid the danger of cutting by metal boxes. Their journey to tropical countries is eased and assured of a good conservation in these countries. They avoid oxidisation for time when open, the concentrated tomatoes thus treated can be easily conserved in cold storage without alteration to the colour and the taste.

As previously noted, the process, object of the invention, improves the packaging in metal or glass of concentrated tomatoes in view of its perfect preservation, of its colour and its taste.

It can be equally applied to products other than concentrated tomatoes, which change colour under the action of gases and oxygen, such as for example spinach and other consumable products.

I claim:

Process for packaging concentrated tomatoes for preservation; comprising the steps of removing a gas from the product by placing the latter in a vacuum of 730 to 740 mm. of mercury, placing the product in this state and free from air into a container formed from a material which is impermeable to gases and water vapour, sealing said container, and sterilizing the package and its contents by heating at about 90° C. for a period of time sufficient to destroy bacteria in the tomatoes.

References Cited in the file of this patent

UNITED STATES PATENTS

| | | |
|---|---|---|
| 2,044,639 | Schneider | June 16, 1936 |
| 2,364,049 | Bensel | Dec. 5, 1944 |
| 2,380,134 | Waters | July 10, 1945 |
| 2,401,131 | Bensel | May 28, 1946 |